United States Patent
Grochowski et al.

(10) Patent No.: US 8,342,996 B2
(45) Date of Patent: Jan. 1, 2013

(54) MULTI-SPEED TRANSMISSION WITH MULTI-AXIS TRANSFER

(75) Inventors: Edwin T. Grochowski, Howell, MI (US); Scott H. Wittkopp, Ypsilanti, MI (US); James B. Borgerson, Clarkston, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 723 days.

(21) Appl. No.: 12/507,307

(22) Filed: Jul. 22, 2009

(65) Prior Publication Data

US 2011/0021300 A1 Jan. 27, 2011

(51) Int. Cl.
*F16H 3/72* (2006.01)
(52) U.S. Cl. ............................................ 475/5; 475/271
(58) Field of Classification Search .............. 475/5, 271, 475/275–291
See application file for complete search history.

(56) References Cited

U.S. PATENT DOCUMENTS

| | | | |
|---|---|---|---|
| 6,478,705 B1 * | 11/2002 | Holmes et al. ..................... | 475/5 |
| 2002/0094898 A1 * | 7/2002 | Hata et al. .......................... | 475/5 |
| 2006/0025264 A1 * | 2/2006 | Sowul et al. ....................... | 475/5 |
| 2006/0025265 A1 * | 2/2006 | Sowul et al. ....................... | 475/5 |
| 2006/0154772 A1 * | 7/2006 | Schmidt et al. .................... | 475/5 |
| 2010/0210388 A1 * | 8/2010 | Grochowski et al. ............. | 475/5 |

* cited by examiner

*Primary Examiner* — Justin Holmes
*Assistant Examiner* — Huan Le
(74) *Attorney, Agent, or Firm* — Quinn Law Group, PLLC

(57) ABSTRACT

Various embodiments of electrically-variable transmissions are provided that have two motor-generators, two planetary gear sets, and two torque-transmitting mechanisms, including a rotating-type clutch and a stationary-type clutch. An input member is connected for common rotation with a ring gear of the first planetary gear set. Carriers of both of the planetary gear sets are connected for common rotation with one another, and with an output member. The first motor/generator is connected for common rotation with the sun gear of the first planetary gear set. The second motor/generator is connected for common rotation with the sun gear of the second planetary gear set. A drive transfer assembly transfers torque from components establishing the first axis of rotation through components establishing one or two additional axes of rotation to a differential establishing yet another axis of rotation.

20 Claims, 5 Drawing Sheets

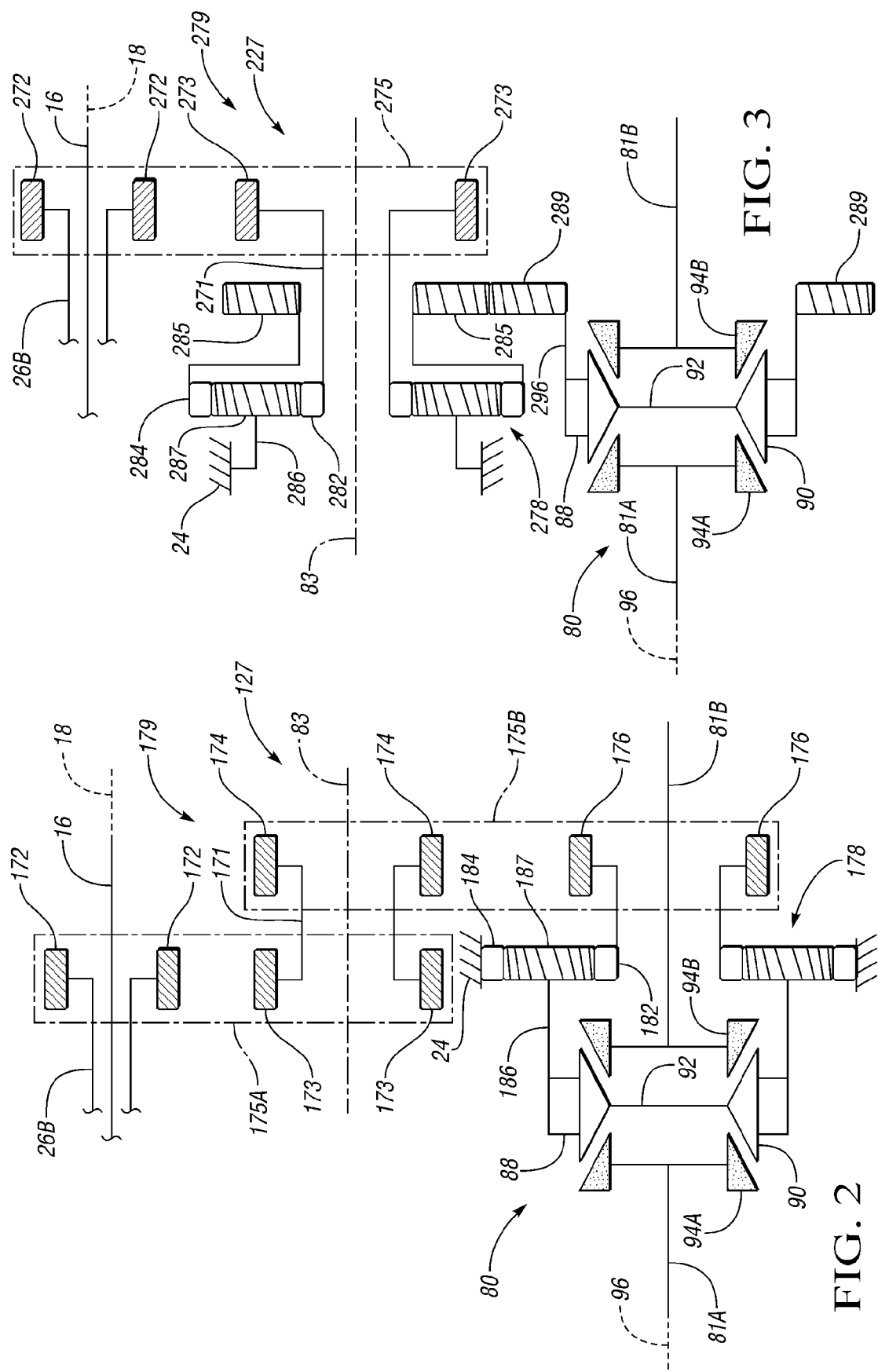

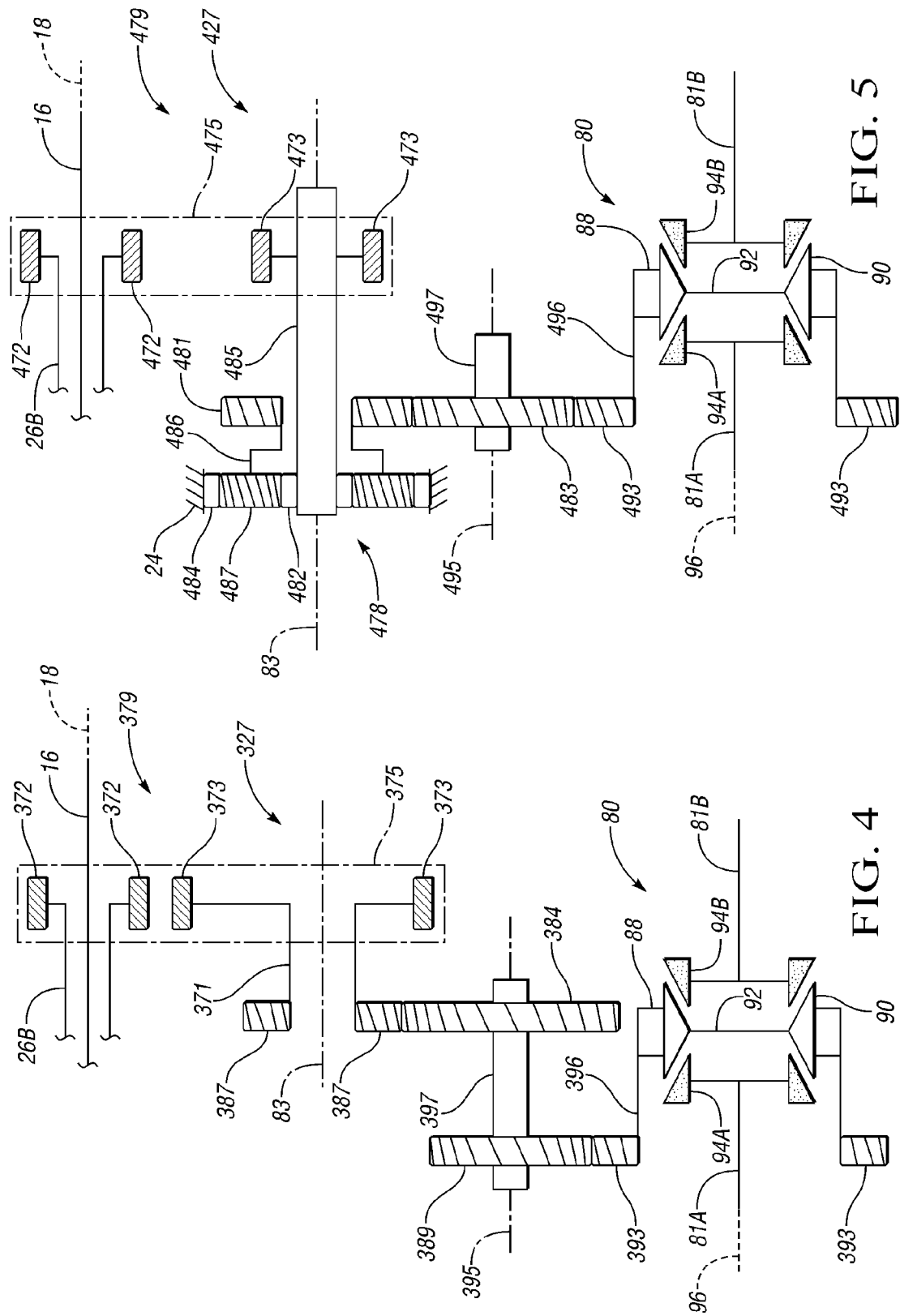

MULTI-SPEED TRANSMISSION WITH MULTI-AXIS TRANSFER

TECHNICAL FIELD

The disclosure relates to a multi-speed transmission with transfer of torque from components defining a first rotational axis through components defining one or two additional rotational axes to a differential defining yet another rotational axis.

BACKGROUND OF THE INVENTION

Electrically-variable transmissions typically have an input member, an output member, and two electric motor/generators connected to different members of planetary gear sets. Clutches allow one or more electrically-variable modes of operation, fixed speed ratio modes, and an electric-only (battery-powered) mode. Electrically-variable transmissions may improve vehicle fuel economy in a variety of ways, primarily by using one or both of the motor/generators for vehicle braking and using the regenerated energy to power the vehicle electrically, with the engine off. The engine may be turned off at idle, during periods of deceleration and braking, and during periods of low speed or light load operation to eliminate efficiency losses due to engine drag. Braking energy captured via regenerative braking (or electrical energy generated during periods when the engine is operating) is utilized during these engine-off periods. Transient demand for engine torque or power is supplemented by the motor/generators during operation in engine-on modes, allowing for a smaller engine without reducing vehicle performance. Additionally, the electrically-variable modes may allow the engine to be operated at or near the optimal efficiency point for a given power demand.

It is challenging to package two motor/generators, planetary gear sets, and multiple torque-transmitting mechanisms necessary to achieve the desired modes of operation, while meeting other applicable dimensional limitations and achieving relatively simple assembly requirements. Furthermore, although electrically variable transmissions are being mass-produced today, they are installed in only a very small fraction of the total number of vehicles produced today, and so engineering and tooling costs are likely to be a relatively larger portion of the total production costs as compared with those costs for other types of transmissions.

SUMMARY OF THE INVENTION

Various embodiments of electrically-variable transmissions are provided that have a first and a second motor-generator, a first and a second planetary gear set, and two torque-transmitting mechanisms, including a rotating-type clutch and a stationary-type clutch. An input member is connected for common rotation with a ring gear of the first planetary gear set. Carriers of both of the planetary gear sets are connected for common rotation with one another, and with an output member. The first motor/generator is connected for common rotation with the sun gear of the first planetary gear set. The second motor/generator is connected for common rotation with the sun gear of the second planetary gear set.

A drive transfer assembly is provided that includes a drive member connected to the output member for rotation therewith, and a driven member operatively connected to the drive member and rotatably driven by the drive member about a second axis of rotation. In some embodiments, the drive member and the driven member are sprockets connected with one another via a chain. In other embodiments, the drive member and the driven member are gears meshing with one another or otherwise operatively connected. The drive transfer assembly includes a differential having a carrier, and first and second side gears. The first and second side gears establish a third axis of rotation. The drive transfer assembly also includes a torque transfer arrangement operatively connected with the differential and with the driven member to transfer torque from the driven member to the differential.

In some embodiments, the torque transfer arrangement includes components establishing a fourth axis of rotation located between and generally parallel with the second and third axes of rotation. A gearing arrangement may be provided, such as a planetary gear set, having first, second, and third members. The first member is connected for rotation with a first member of the torque transfer arrangement, the second member is connected for rotation with one of a second member of the torque transfer arrangement and the carrier of the differential, and the third member is grounded to the stationary member.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic illustration of a second embodiment of a drive transfer assembly;

FIG. 3 is a schematic illustration of a third embodiment of a drive transfer assembly;

FIG. 4 is a schematic illustration of a fourth embodiment of a drive transfer assembly;

FIG. 5 is a schematic illustration of a fifth embodiment of a drive transfer assembly;

DESCRIPTION OF THE PREFERRED EMBODIMENTS

Figure 1:
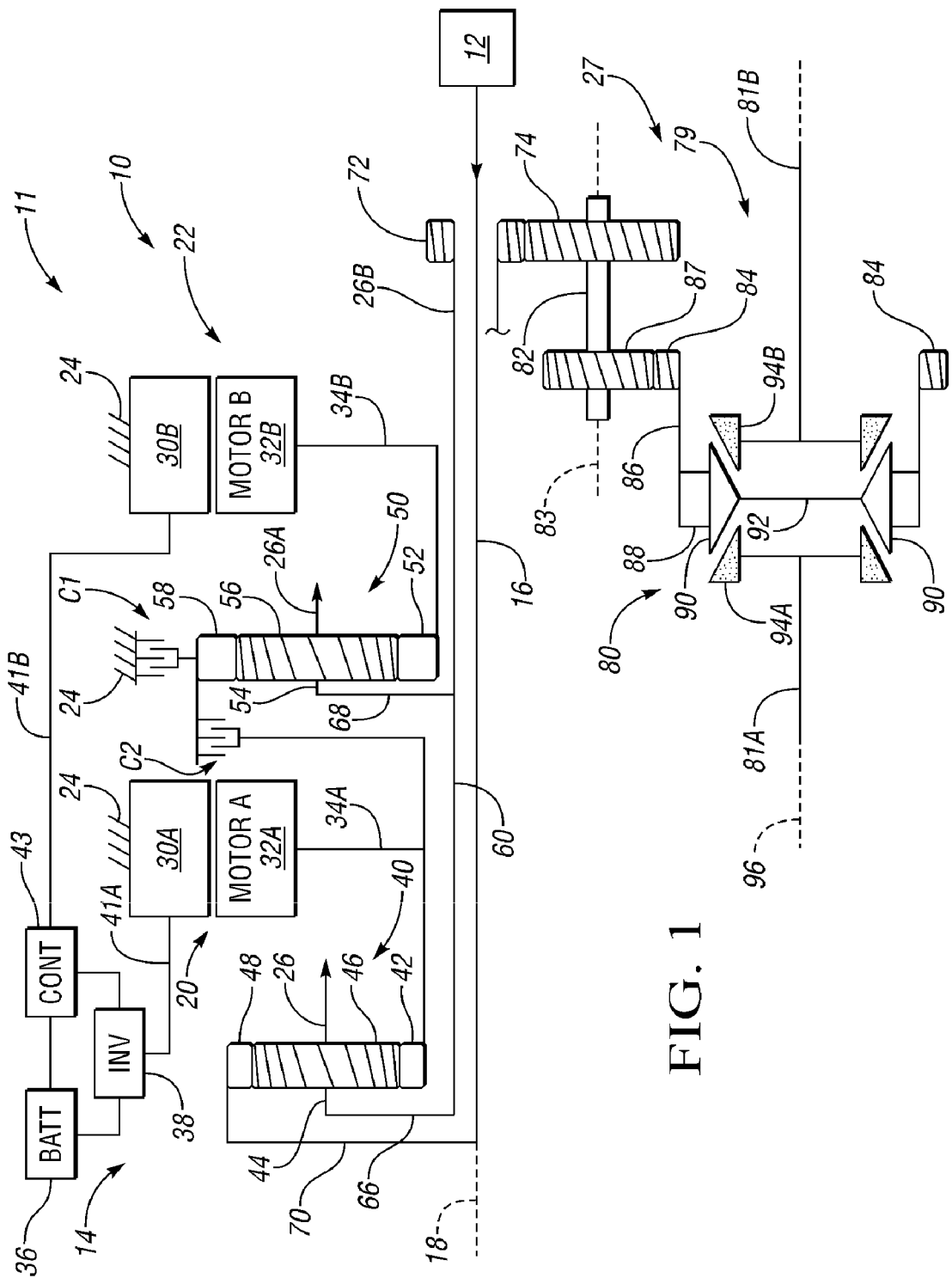
FIG. 1 is a schematic illustration of a first embodiment of a hybrid electric powertrain including a first embodiment of an electrically variable transmission with a first embodiment of a drive transfer assembly.

Referring to the drawings wherein like reference numbers refer to like components, FIG. 1 shows a powertrain 10 for a vehicle 11. The powertrain 10 includes an engine 12 drivingly connected with an electrically variable transmission 14. An output member of the engine 12 is connected for driving an input member 16 of the transmission 14. The input member 16 rotates about and establishes an axis of rotation 18.

A first motor/generator 20 and a second motor/generator 22 are packaged within a transmission casing 24 and are operatively connected between the input member 16 and three alternative transmission output members 26, 26A, 26B. The transmission casing 24 is shown only in part, and is generally annular, surrounding the entire transmission 14, with end walls closing off the axial ends and having access openings for the input member 16 and the output member 26, 26A or 26B to extend therethrough. As discussed below, alternate locations serving as alternate transmission output members 26, 26A, 26B are also provided. All of the potential output members 26, 26A, 26B are interconnected to rotate commonly (i.e., at the same speed). Any one, but only one, of the transmission output members 26, 26A and 26B may be connected with a drive transfer assembly 27 to a final drive (i.e., differential 80). The selection of which output location will serve as the output member connected with the drive transfer assembly 27 will depend on packaging requirements of the powertrain 10 within the vehicle. As discussed below, in FIG. 1, output member 26B is connected with the drive transfer assembly 27. The various drive transfer assemblies shown and described herein are not necessarily to scale; however, positioning of the drive transfer assembly within the transmission ensures appropriate component clearances.

The first motor/generator 20 includes an annular stator 30A grounded to the transmission casing 24, an annular rotor 32A supported on and for rotation with a rotatable rotor hub 34A and concentric about the first axis of rotation 18. A battery 36, power inverter 38 and electronic controller 43 are operatively connected with the stator 30A via transfer conductor 41A to control the functioning of the motor/generator 20 as a motor, in which stored electrical power is provided by the battery 36 to the stator 30A, and a generator, in which torque of the rotating rotor 32A is converted to electrical power stored in the battery 36. The ability to control a motor/generator to function as a motor or as a generator is well known.

Similarly, the second motor/generator 22 includes an annular stator 30B grounded to the transmission casing 24, an annular rotor 32B supported on a rotatable rotor hub 34B and concentric about the axis of rotation 18. The battery 36, power inverter 38 and electronic controller 43 are operatively connected with the stator 30B via transfer conductor 41B to control the functioning of the motor/generator 22 as a motor and a generator.

The transmission 14 further includes first and second planetary gear sets 40, 50. Planetary gear set 40 has a first member that is a sun gear 42, a second member that is a carrier 44 that rotatably supports a plurality of pinion gears 46 meshing with the sun gear 42, and a third member that is a ring gear 48 also meshing with the pinion gears 46. Rotor hub 34A is connected for common rotation with the sun gear 42. Alternative output member 26 is connected to carrier 44 for rotation therewith.

Planetary gear set 50 has a first member which is a sun gear 52, a second member that is a carrier 54 that rotatably supports a plurality of pinion gears 56 meshing with the sun gear 52, and a third member that is a ring gear 58 also meshing with the pinion gears 56. Alternate output member 26A is connected with the carrier 54 for rotation therewith. Rotor hub 34B is connected for rotation with the sun gear 52.

The transmission 14 includes two torque-transmitting mechanisms. A stationary-type clutch C1, also referred to as a brake, is selectively engagable to ground the ring gear 58 to the transmission casing 24. Rotating-type clutch C2 is selectively engagable to connect the sun gear 42 for common rotation with ring gear 58. Those skilled in the art will recognize that only a portion of the transmission 14 above the input member 16 is shown schematically; and portions of the planetary gear sets 40, 50, clutches C1, C2 and other components generally symmetrical about the input member 16 are not shown.

Annular sleeve shaft 60 forming output member 26B concentric with the input member 16, and hub members 66 and 68 connect the carriers 44, 54 for common rotation with the shaft 60, and with all of the alternate output members 26, 26A, 26B. Hub member 70 extends from input member 16 to connect the ring gear 48 for common rotation therewith.

Transmission 14 is configured so that planetary gear set 40 is positioned axially between a radially-extending end wall (not shown) of the casing 24 and the motor/generator 20. The end wall is to the left of the planetary gear set 40 as the transmission 14 is illustrated in FIG. 1. Planetary gear set 50 is positioned axially between the motor/generators 20, 22. Clutch C1 is positioned radially outward and aligned with the ring gear 58 of planetary gear set 50. Clutch C2 is positioned axially between motor/generator 20 and planetary gear set 50 and is aligned with ring gear 58.

A first forward mode of operation is established by engaging clutch C1 and releasing clutch C2. This mode of operation is an input-split operating mode, with planetary gear set 40 operating in a differential mode and planetary gear set 50 operating in a torque multiplication mode, engine 12 providing torque and motor/generator 20 motoring in a forward direction. A reverse electrically variable operating mode is established with the same clutch engagement, but with the motor/generator 20 motoring in a reverse direction.

A second forward mode of operation is established by engaging clutch C2 and disengaging clutch C1. The shift between modes occurs when the speed of rotor 32A is zero, and the speed of ring gear 58 is also zero (due to engagement of clutch C1), so that the shift can occur without torque disturbance. A fixed forward speed ratio is established by engaging both clutches C1 and C2.

The drive transfer assembly 27 is shown driven by the output member 26B to transfer torque from the transmission 14 to vehicle wheels. Specifically, a drive member 72 in the form of a gear is mounted to the output member 26B for rotation therewith. The drive member 72 meshes with a driven member 74, also in the form of a gear, to transfer drive torque from the drive member 72 to the driven member 74. The driven member 74 is operatively connected with a differential 80 via a torque transfer arrangement 79 and, ultimately, to wheel axles 81A, 81B to deliver torque to vehicle wheels.

The torque transfer arrangement 79 includes a shaft 82 that supports driven member 74 and a gear 87 mounted on shaft 82 for rotation therewith, establishing a second axis of rotation 83. The torque transfer arrangement 79 further includes a gear 84 attached for rotation with a carrier 88 of the differential 80 via a hub 86.

The differential 80 includes the carrier 88 that rotatably supports pinion gears 90 rotating on a pinion shaft 92. The pinion gears 90 mesh with side gears 94A and 94B, also referred to as bevel gears. Side gear 94A is connected for common rotation with wheel axle 81A, and side gear 94B is connected for common rotation with wheel axle 81B. The side gears 94A, 94B and wheel axles 81A, 81B rotate about and establish a third axis of rotation 96.

Thus, the transmission 14 is configured to transfer torque from a first axis of rotation 18, partially defined by the input member 16 and the output member 26B, to a second axis of rotation 83, partially defined by the driven member 74, and through a torque transfer arrangement 79 to a third axis of rotation 96, partially defined by wheel axles 81A, 81B. In the embodiment of FIG. 1, the drive member 72 is positioned axially adjacent the motor/generator 22 opposite the other motor/generator 20 and the planetary gear sets 40, 50.

Second Drive Transfer Assembly Embodiment

FIG. 2 shows another embodiment of a drive transfer assembly 127 connected to the output member 26B of transmission 14 for transferring torque to wheel axles 81A, 81B. Components that are the same as those of drive transfer assembly 27 are shown and described with the same reference numbers. Drive member 172 is a sprocket supported for rotation with output member 26B. Driven member 173 is a sprocket supported on a shaft 171 and partially defines with the shaft 171 the second axis of rotation 83. Chain 175A transfers torque from drive member 172 to driven member 173. Drive member 172 and driven member 173 and a first set of sprockets and chain 175A is a first chain.

Sprocket 174 is also supported on shaft 171 for rotation therewith. A second chain 175B transfers torque from the sprocket 174 to sprocket 176. Sprockets 174 and 176 are a second set of sprockets and chain 175B is a second chain. Sprocket 176 is connected for rotation with sun gear 182 of gearing arrangement 178. Sun gear 172 is referred to as a first member of the gearing arrangement 178 and sprocket 176 as a first member of the torque transfer arrangement. Gearing arrangement 178 also includes a second member, carrier member 186 that rotatably supports pinion gears 187, and a third member, ring gear 184 that meshes with the pinion gears 187 and is grounded to stationary member 24. Carrier 186 is connected for rotation with carrier member 88 of the differential 80.

Accordingly, a torque transfer arrangement 179 that transfers torque from the driven gear 173 to the differential 80 includes shaft 171, the second set of sprockets 174, 176, the chain 175B, and the gearing arrangement 178.

Third Drive Transfer Assembly Embodiment

FIG. 3 shows another embodiment of a drive transfer assembly 227 connected to the output member 26B of transmission 14 for transferring torque to wheel axles 81A, 81B. Components that are the same as those of drive transfer assembly 27 are shown and described with the same reference numbers. Drive member 272 is a sprocket supported for rotation on output member 26B. Driven member 273 is a sprocket supported on a shaft 271 and partially defines with the shaft 271 the second axis of rotation 83. Chain 275 transfers torque from drive member 272 to driven member 273.

Sun gear 282 of gearing arrangement 278 is mounted on shaft 271 for rotation therewith. Sun gear 282 is referred to as a first member of the gearing arrangement 278 and sprocket 273 as a first member of the torque transfer arrangement 279. Gearing arrangement 278 also includes a second member, ring gear 284, and a third member, carrier member 286 that rotatably supports pinion gears 287. Ring gear 284 is connected via a hub for rotation with a gear 285, referred to as a second member of the torque transfer arrangement 279. Carrier member 286 is a third member of the gearing arrangement 278 and is grounded to the stationary member 24. Gear 285 meshes with gear 289, which is connected for rotation with the carrier member 88 of the differential 80 via hub 296.

Accordingly, a torque transfer arrangement 279 that transfers torque from the driven gear 273 to the differential 80 includes a shaft 271, the gearing arrangement 278, intermeshing gears 285 and 289, and hub 296.

Fourth Drive Transfer Assembly Embodiment

FIG. 4 shows another embodiment of a drive transfer assembly 327 connected to the output member 26B of transmission 14 for transferring torque to wheel axles 81A, 81B. Components that are the same as those of drive transfer assembly 27 are shown and described with the same reference numbers. Drive member 372 is a sprocket supported for rotation on output member 26B. Driven member 373 is a sprocket supported on a shaft 371 and partially defines with the shaft 371 the second axis of rotation 83. Chain 375 transfers torque from drive member 372 to driven member 373.

A torque transfer arrangement 379 operable to transfer torque from the driven member 373 to the differential 80 includes the shaft 371 and another gear 387 mounted for rotation with shaft 371. Gear 387 meshes with gear 384, which is mounted on shaft 397 for rotation therewith and partially defines with shaft 397 a fourth axis of rotation 395. Another gear 389 is mounted for rotation with shaft 397 and meshes with gear 393, which is mounted for rotation with a hub 396 connected with carrier 88.

Accordingly, the torque transfer arrangement 379 that transfers torque from the driven gear 373 to the differential 80 includes a shaft 371, the intermeshing gears 387 and 384, shaft 397, intermeshing gears 389 and 393, and hub 396. Four axes of rotation are established by the transmission 14: the first axis of rotation 18, and the three axes of rotation of the drive transfer assembly, second axis of rotation 83, third axis of rotation 96, and fourth axis of rotation 395.

Fifth Drive Transfer Assembly Embodiment

FIG. 5 shows another embodiment of a drive transfer assembly 427 connected to the output member 26B of transmission 14 for transferring torque to wheel axles 81A, 81B. Components that are the same as those of drive transfer assembly 27 are shown and described with the same reference numbers. Drive member 472 is a sprocket supported for rotation with output member 26B. Driven member 473 is a sprocket supported on a shaft 485 and partially defines with the shaft 485 the second axis of rotation 83. Chain 475 transfers torque from drive member 472 to driven member 473.

Sun gear 482 of gearing arrangement 478 is mounted on shaft 485 for rotation therewith. Sun gear 482 is referred to as a first member of the gearing arrangement 478 and sprocket 473 as a first member of the torque transfer arrangement 479. Gearing arrangement 478 also includes a second member, carrier member 486 that rotatably supports pinion gears 487, and a third member, ring gear 484. Ring gear 484 is grounded to stationary member 24. Carrier member 486 is connected for rotation with a gear 481, referred to as a second member of the torque transfer arrangement 479. The planetary gearing arrangement 478, the shaft 485, gears 481 and sprocket 473 define the second axis of rotation 83.

Gear 481 meshes with gear 483, which is connected for rotation with a shaft 497 and defines therewith a fourth axis of rotation 495. Gear 483 meshes with gear 493 which is connected with a hub 496 for rotation with the carrier 88 of the differential 80.

Accordingly, a torque transfer arrangement 479 that transfers torque from the driven member 473 to the differential 80 includes shaft 485, planetary gearing arrangement 478, the intermeshing gears 481, 483, and 493, shaft 497, and hub 496. Four axes of rotation are established by the transmission 14: the first axis of rotation 18, and the three axes of rotation of the drive transfer assembly, second axis of rotation 83, third axis of rotation 96, and fourth axis of rotation 495.

Second Transmission Embodiment with Sixth Drive Transfer Assembly Embodiment

Figure 6:
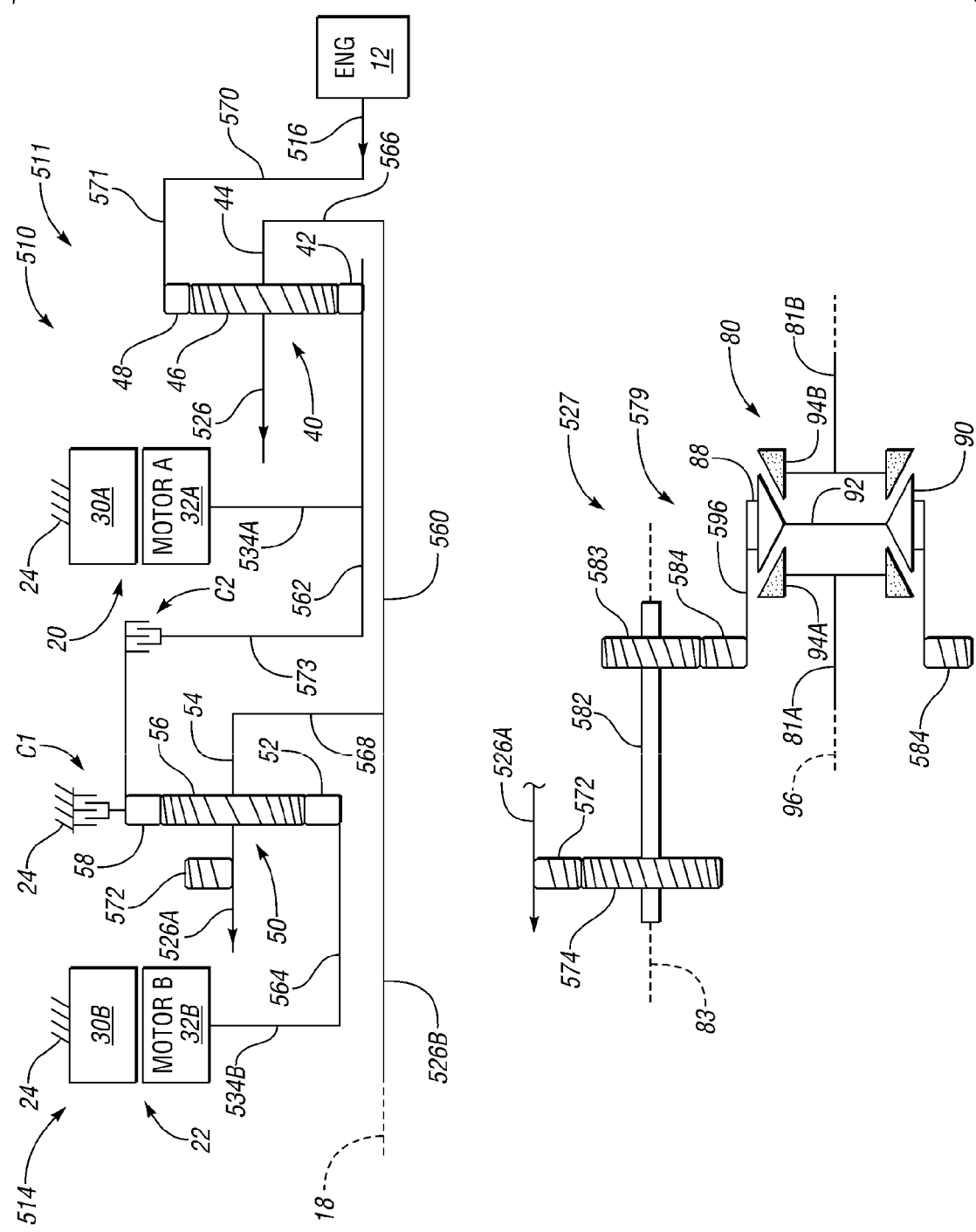
FIG. 6 is a schematic illustration of a second embodiment of a hybrid electric powertrain including a second embodiment of an electrically variable transmission with a sixth embodiment of a drive transfer assembly.

Referring to FIG. 6, powertrain 510 for vehicle 511 includes an engine 12 and an electrically variable transmission 514 having many of the same components, referred to with the same reference numbers, that function in the same way as shown and described with respect to the transmission 14 and powertrain 10 of FIG. 1. Although not shown in FIG. 6, a battery 36, inverter 38, and controller 43 are connected with the stators 30A, 30B as shown and described in FIG. 1.

Transmission 514 is configured so that motor/generator 20 is positioned axially between a radially-extending end wall (not shown) of the casing 24 and the planetary gear set 50. Clutch C1 is positioned radially outward and aligned with the ring gear 58 of planetary gear set 50. Clutch C2 is positioned axially between motor/generator 20 and planetary gear set 50. Planetary gear set 50 is positioned axially between motor/generator 20 and the motor/generator 22. Motor/generator 22 is positioned axially between the planetary gear set 50 and an end wall (not shown) of casing 24. Planetary gear set 40 is positioned axially between motor/generator 20 and an opposing radially-extending end wall (not shown) of the casing 24.

Transmission 514 has an input member 516 axially spaced from and coaxial but not concentric with shaft 560. Shaft 560 connects to alternative output members 526, 526A, 526B. Sleeve shaft 562 is coaxial with shaft 560. Output members 526, 526A share a common axis of rotation 18 with input member 516. Input member 516 is connected for common rotation with ring gear 48 via hub 570 and axial extending portion 571. Shaft 562 connects rotor hub 534A for common rotation with sun gear 42. The clutch C2 is nested between planetary gear set 50, hub 573 and shaft 562. Shaft 560 connects carrier member 54 to carrier member 44, via hubs 566, 568, and thereby to an output member 526 connected to carrier member 44. Sleeve shaft 564 connects rotor hub 534B with sun gear 52. Alternate output member 526A extends from the carrier member 54.

Drive transfer assembly 527 is connected to the output member 526A of transmission 514 for transferring torque to wheel axles 81A, 81B. Components that are the same as those of drive transfer assembly 27 are shown and described with the same reference numbers. Drive member 572 is a gear supported for rotation with output member 526A. Driven member 574 is a gear meshing with driven member 572 and supported for rotation with shaft 582. Driven member 574 partially defines with the shaft 582 the second axis of rotation 83.

Torque transfer arrangement 579 transfers torque from the driven member 574 to the differential 80 and includes the shaft 582 and another gear 583 supported for rotation with the shaft 582. Gear 583 meshes with gear 584, which is connected via a hub 596 for rotation with the carrier 88 of differential 80.

Accordingly, a torque transfer arrangement 579 that transfers torque from the driven member 574 to the differential 80 includes shaft 582, intermeshing gears 583 and 584, and hub 596. Three axes of rotation are established by the transmission 14, including two by the drive transfer assembly 579: the first axis of rotation 18, second axis of rotation 83, and third axis of rotation 96.

Third Transmission Embodiment with Seventh Drive Transfer Assembly Embodiment

Figure 7:
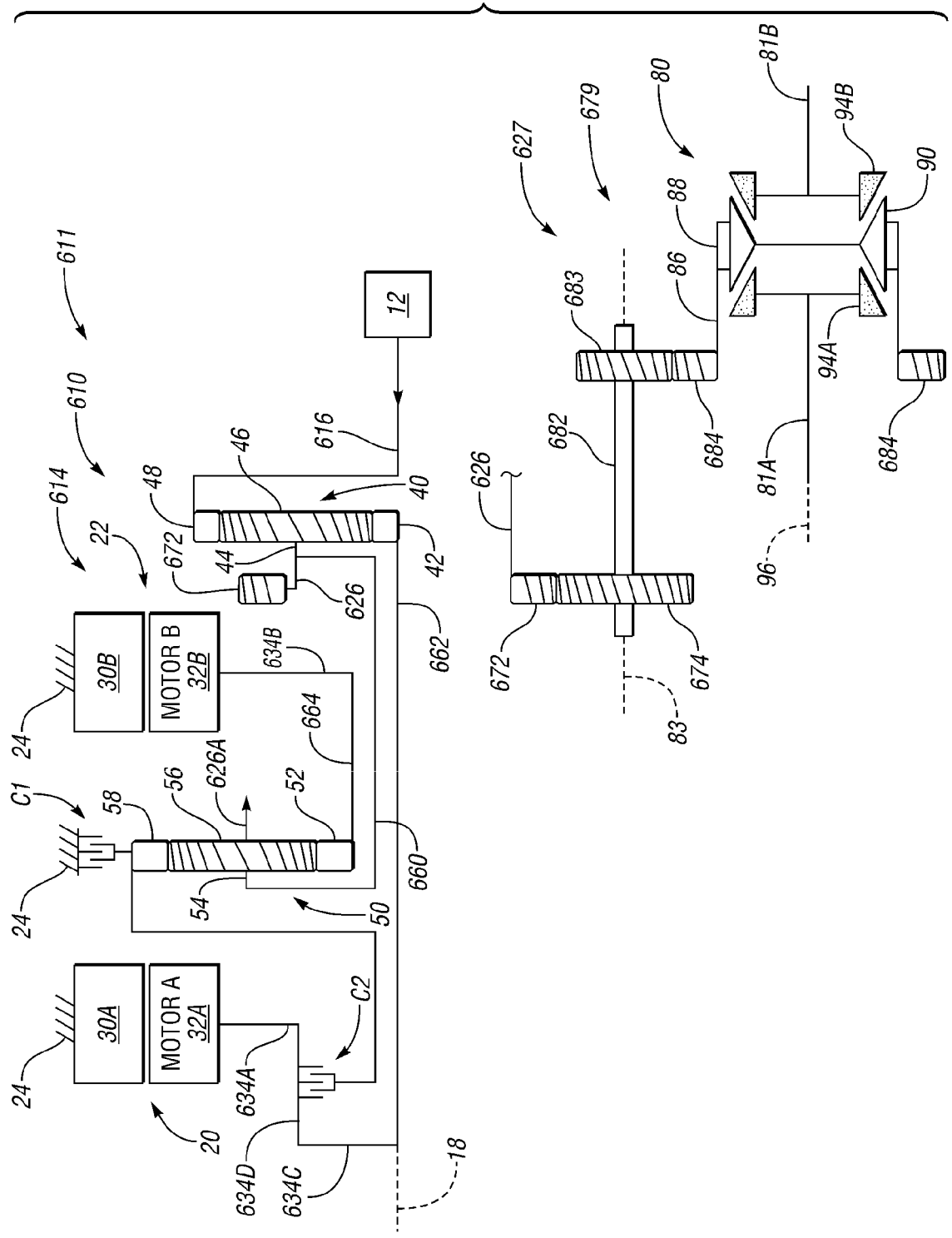
FIG. 7 is a schematic illustration of a third embodiment of a hybrid electric powertrain including a third embodiment of an electrically variable transmission with a seventh embodiment of a drive transfer assembly.

Referring to FIG. 7, powertrain 610 for vehicle 611 includes an engine 12 and an electrically variable transmission 614 having many of the same components, referred to with the same reference numbers, that function in the same way as shown and described with respect to the transmission 14 and powertrain 10 of FIG. 1. Although not shown in FIG. 7, a battery 36, inverter 38, and controller 43 are connected with the stators 30A, 30B as shown and described in FIG. 1.

Transmission 614 is configured so that motor/generator 20 is positioned axially between a radially-extending end wall (not shown) of the casing 24 and the planetary gear set 50. Clutch C1 is positioned radially outward and aligned with the ring gear 58 of planetary gear set 50. Clutch C2 is positioned radially inward of motor/generator 20, and axially between the end wall and planetary gear set 50. Clutch C2 may be circumscribed by motor/generator 20. Planetary gear set 50 is positioned axially between motor/generator 20 and the motor/generator 22. Motor/generator 22 is positioned axially between the planetary gear set 50 and planetary gear set 40. Planetary gear set 40 is positioned between motor/generator 22 and an opposing radially-extending end wall (not shown) of the casing 24.

Transmission 614 has an input member 616 axially spaced from and coaxial but not concentric with shaft 660, which connects to alternative output members 626, 626A. Shaft 662 is coaxial with input member 616. Output members 626, 626A share a common axis of rotation 18 with input member 616. Input member 616 is connected for common rotation with ring gear 48. Shaft 662 connects rotor hub 634A for common rotation with sun gear 42, via hub portions 634D and 634C. The clutch C2 is nested between axially-extending hub portion 634D, hub portion 634C and the shaft 662. Sleeve shaft 660 is concentric with shaft 662 and connects carrier member 54 to carrier member 44 and output member 626. Sleeve shaft 664 connects rotor hub 634B with sun gear 52. Alternate output member 626A extends from carrier member 54.

Drive transfer assembly 627 of FIG. 7 connects a drive member 672 mounted for rotation with the output member 626 of transmission 614 for transferring torque to differential 80 and wheel axles 81A, 81B via torque transfer arrangement 679. Drive member 672 is a gear that meshes with driven member 674, which is a gear mounted for rotation with shaft 682 and partially establishing the second axis of rotation 83. Drive member 672 is positioned axially between motor/generator 22 and planetary gear set 40.

The torque transfer arrangement 679 includes shaft 682, another gear 683 mounted for rotation with shaft 682 and meshing with gear 684, which is mounted for rotation with hub 86 connected to carrier 88.

Accordingly, a torque transfer arrangement 679 that transfers torque from the driven member 674 to the differential 80 includes shaft 682, intermeshing gears 683 and 684, and hub 86. Three axes of rotation are established by the transmission 14, including two by the drive transfer assembly 679: the first axis of rotation 18, second axis of rotation 83, and third axis of rotation 96.

While the best modes for carrying out the invention have been described in detail, those familiar with the art to which this invention relates will recognize various alternative designs and embodiments for practicing the invention within the scope of the appended claims.

The invention claimed is:

1. An electrically-variable transmission for a vehicle, comprising:
    an input member; an output member; a stationary member; wherein the input member and the output member establish a first axis of rotation;
    a first and a second planetary gear set, each having a sun gear, a carrier rotatably supporting pinion gears, and a ring gear, with the pinion gears meshing with both the sun gear and the ring gear;
    a first and a second motor/generator; wherein the first motor/generator is connected for rotation with the sun gear of the first planetary gear set and the second motor/generator is connected for rotation with the sun gear of the second planetary gear set;

a first torque-transmitting mechanism selectively engagable to ground the ring gear of the second planetary gear set to the stationary member;
a second torque-transmitting mechanism selectively engagable to connect the sun gear of the first planetary gear set for rotation with the ring gear of the second planetary gear set;
a drive member connected to the output member for rotation therewith;
a first shaft continuously connecting the carrier of the first planetary gear set for common rotation with the carrier of the second planetary gear set;
a driven member operatively connected to the drive member and rotatably driven by the drive member about a second axis of rotation;
a differential having a carrier, and first and second side gears; wherein the first and second side gears establish a third axis of rotation; and
a torque transfer arrangement operatively connected with the differential and with the driven member to transfer torque from the driven member to the differential.

2. The electrically-variable transmission of claim 1, wherein the drive member is positioned axially between one of the motor/generators and one of the planetary gear sets.

3. The electrically-variable transmission of claim 1, wherein the drive member is positioned axially between the motor/generators.

4. The electrically-variable transmission of claim 1, wherein the first torque-transmitting mechanism is positioned radially outward of and is aligned with the ring gear member of the second planetary gear set.

5. The electrically-variable transmission of claim 1, wherein the second torque-transmitting mechanism is positioned radially inward of the first motor/generator.

6. The electrically-variable transmission of claim 1, wherein the second planetary gear set is positioned axially between the first motor/generator and the second motor/generator; and
wherein the second motor/generator is positioned axially between the first planetary gear set and the second planetary gear set.

7. The electrically-variable transmission of claim 1, wherein the drive member and the driven member are gears meshing with one another;
wherein the torque-transfer arrangement includes a second shaft on which the driven member is mounted and which rotates with the driven member;
another gear mounted on the second shaft and rotating with the second shaft; and
a different gear connected to rotate with the carrier of the differential and meshing with said another gear.

8. The electrically-variable transmission of claim 1, wherein the torque transfer arrangement includes components establishing a fourth axis of rotation located between and generally parallel with the second and third axes of rotation.

9. The electrically-variable transmission of claim 8, wherein the components establishing the fourth axis of rotation include:
a second shaft rotatable about the fourth axis of rotation; and
at least one gear mounted to the second shaft for rotation with the second shaft and meshing with another gear that is rotatable with the driven member about the second axis of rotation.

10. The electrically-variable transmission of claim 1, wherein the drive member and the driven member are gears meshing with one another.

11. The electrically-variable transmission of claim 1, wherein the drive member and the driven member are sprockets; and further comprising:
a chain operatively connecting the drive member and the driven member.

12. The electrically-variable transmission of claim 11, wherein the chain is a first chain and the sprockets are a first set of sprockets; and wherein the torque transfer arrangement includes a second set of sprockets and a second chain operatively connecting the sprockets of the second set to transfer torque from the driven member to the differential.

13. The electrically-variable transmission of claim 1, further comprising:
a gearing arrangement having first, second, and third members; wherein the first member of the gearing arrangement is connected for rotation with a first member of the torque transfer arrangement, the second member of the gearing arrangement is connected for rotation with one of a second member of the torque transfer arrangement and the carrier of the differential, and the third member of the gearing arrangement is grounded to the stationary member.

14. The electrically-variable transmission of claim 13, wherein the gearing arrangement is positioned axially between the differential and at least a portion of the torque transfer arrangement.

15. The electrically-variable transmission of claim 13, wherein the gearing arrangement is concentric with the third axis of rotation.

16. The electrically-variable transmission of claim 13, wherein the gearing arrangement is concentric with the second axis of rotation.

17. An electrically-variable transmission for a vehicle, comprising:
an input member, an output member, and a stationary member; wherein the input member and the output member establish a first axis of rotation;
a first and a second planetary gear set, each having a sun gear, a carrier rotatably supporting pinion gears, and a ring gear, with the pinion gears meshing with both the sun gear and the ring gear;
a first and a second motor/generator; wherein the first motor/generator is connected for rotation with the sun gear of the first planetary gear set and the second motor/generator is connected for rotation with the sun gear of the second planetary gear set;
a first torque-transmitting mechanism selectively engagable to ground the ring gear of the second planetary gear set to the stationary member;
a second torque-transmitting mechanism selectively engagable to connect the sun gear of the first planetary gear set for rotation with the ring gear of the second planetary gear set;
a drive member connected to the output member for rotation therewith; wherein the drive member is axially between one of the motor/generators and one of the planetary gear sets;
a first shaft continuously connecting the carrier of the first planetary gear set for common rotation with the carrier of the second planetary gear set;
a driven member operatively connected to the drive member and rotatably driven by the drive member about a second axis of rotation;

a differential having a carrier, and first and second side gears; wherein the first and second side gears establish a third axis of rotation;

a torque transfer arrangement operatively connected with the differential and with the driven member to transfer torque from the driven member to the differential; and wherein the second motor/generator is located axially between the first planetary gear set and the second planetary gear set.

18. The electrically-variable transmission of claim 17, wherein the drive member and the driven member are gears meshing with one another.

19. The electrically-variable transmission of claim 18, wherein the torque-transfer arrangement includes a second shaft on which the driven member is mounted and which rotates with the driven member;

another gear mounted on the second shaft and rotating with the second shaft; and a different gear connected to rotate with the carrier of the differential and meshing with said another gear.

20. An electrically-variable transmission for a vehicle, comprising:

an input member; an output member; a stationary member; wherein the input member and the output member establish a first axis of rotation;

a first and a second planetary gear set, each having a sun gear, a carrier rotatably supporting pinion gears, and a ring gear, with the pinion gears meshing with both the sun gear and the ring gear;

a first and a second motor/generator; wherein the first motor/generator is connected for rotation with the sun gear of the first planetary gear set by a shaft and the second motor/generator is connected for rotation with the sun gear of the second planetary gear set; wherein the second motor/generator is located axially between the first planetary gear set and the second planetary gear set;

only two torque-transmitting mechanisms, including:
  a first torque-transmitting mechanism selectively engagable to ground the ring gear of the second planetary gear set to the stationary member; and
  a second torque-transmitting mechanism selectively engagable to connect the sun gear of the first planetary gear set for rotation with the ring gear of the second planetary gear set;

a drive member connected to the output member for rotation therewith;

a sleeve shaft continuously connecting the carrier of the first planetary gear set for common rotation with the carrier of the second planetary gear set; wherein the sleeve shaft is concentric with the shaft that connects the first motor/generator for rotation with the sun gear of the first planetary gear set;

a driven member operatively connected to the drive member and rotatably driven by the drive member about a second axis of rotation;

a differential having a carrier, and first and second side gears; wherein the first and second side gears establish a third axis of rotation; and a torque transfer arrangement operatively connected with the differential and with the driven member to transfer torque from the driven member to the differential.

* * * * *